(12) United States Patent
Pardee et al.

(10) Patent No.: US 8,393,451 B2
(45) Date of Patent: Mar. 12, 2013

(54) ROTATIONAL COUPLING DEVICE WITH WEAR COMPENSATION STRUCTURE

(75) Inventors: James A. Pardee, Janesville, WI (US); Charles F. Magers, Fort Wayne, IN (US); George P. Gill, Caledonia, IL (US)

(73) Assignee: Warner Electric Technology LLC, Braintree, MA (US)

( * ) Notice: Subject to any disclaimer, the term of this patent is extended or adjusted under 35 U.S.C. 154(b) by 0 days.

(21) Appl. No.: 13/348,994

(22) Filed: Jan. 12, 2012

(65) Prior Publication Data

US 2012/0175214 A1 Jul. 12, 2012

Related U.S. Application Data

(62) Division of application No. 12/268,739, filed on Nov. 11, 2008, now Pat. No. 8,123,012.

(51) Int. Cl.
*F16D 67/06* (2006.01)

(52) U.S. Cl. .......... 192/18 B; 192/84.31; 192/84.5; 192/84.961; 192/111.1

(58) Field of Classification Search .......... 192/18 B, 192/84.31, 84.5, 84.961, 111.1
See application file for complete search history.

(56) References Cited

U.S. PATENT DOCUMENTS

| | | | |
|---|---|---|---|
| 2,659,830 A | 11/1953 | Mason et al. | |
| 3,559,772 A | 2/1971 | Grombka | |
| 3,613,849 A * | 10/1971 | Pape | 192/84.51 |
| 3,677,377 A | 7/1972 | Miller | |
| 3,679,034 A | 7/1972 | Miller | |
| 3,724,619 A | 4/1973 | Miller | |
| 3,777,864 A | 12/1973 | Marti | |
| 3,789,966 A | 2/1974 | Miller | |
| 3,893,191 A * | 7/1975 | Gold et al. | 192/18 B |
| 3,994,379 A | 11/1976 | Miller et al. | |
| 4,496,922 A | 1/1985 | Pardee | |
| 4,556,132 A | 12/1985 | Lengsfeld et al. | |
| 4,566,575 A * | 1/1986 | Sekella | 192/111.1 |
| 4,643,282 A | 2/1987 | Edl | |
| 4,966,255 A * | 10/1990 | Fossum | 188/71.8 |
| 4,993,532 A * | 2/1991 | Weiss et al. | 192/111.1 |
| 5,033,095 A | 7/1991 | Marcantonio | |

(Continued)

FOREIGN PATENT DOCUMENTS

| | | |
|---|---|---|
| EP | 0693633 A2 | 1/1996 |
| JP | 4181034 | 6/1992 |

OTHER PUBLICATIONS

International Search Report issued in corresponding international (PCT) application PCT/US2009/062453 (Jul. 7, 2010).

(Continued)

*Primary Examiner* — David D Le
*Assistant Examiner* — Jacob S Scott
(74) *Attorney, Agent, or Firm* — Dykema Gossett PLLC

(57) ABSTRACT

A rotational coupling device for use as a clutch, a brake, or a combination clutch and brake is provided having structure to compensate for wear on braking surfaces. The device includes an armature coupled to an output member and movable between positions of engagement with a rotor and a brake plate. The brake plate is coupled to a stationary field shell that houses a conductor on one side of the rotor opposite the armature and brake plate. The brake plate is axially spaced from the field shell and a removable shim or adjustable spacer is disposed between the brake plate and the field shell. Removal of the shim or adjustment of the spacer permit movement of the brake plate towards the field shell to compensate for wear in any of the clutch or brake engagement surfaces of the device.

6 Claims, 4 Drawing Sheets

U.S. PATENT DOCUMENTS

| | | | | |
|---|---|---|---|---|
| 5,119,918 | A | | 6/1992 | Pardee |
| 5,285,882 | A | | 2/1994 | Pardee |
| 5,305,865 | A | | 4/1994 | Larson et al. |
| 5,549,186 | A | | 8/1996 | Pardee |
| 5,971,121 | A | | 10/1999 | Pardee |
| 6,013,003 | A | * | 1/2000 | Boffelli et al. ............. 192/84.31 |
| 6,072,258 | A | * | 6/2000 | Lamb ............................ 310/191 |
| 6,119,825 | A | | 9/2000 | Nisley |
| 6,155,386 | A | * | 12/2000 | Hirai et al. ................... 192/84.5 |
| 7,493,996 | B2 | | 2/2009 | Pardee |
| 7,527,134 | B2 | | 5/2009 | Pardee |
| 7,732,959 | B2 | | 6/2010 | Pardee |
| 7,975,818 | B2 | * | 7/2011 | Pardee ........................ 192/18 B |
| 2005/0205374 | A1 | * | 9/2005 | Boffelli et al. ............. 192/84.31 |
| 2006/0278480 | A1 | | 12/2006 | Pardee |
| 2006/0278491 | A1 | | 12/2006 | Pardee |
| 2007/0209896 | A1 | | 9/2007 | Pardee |
| 2007/0227853 | A1 | | 10/2007 | Pardee |
| 2008/0190716 | A1 | | 8/2008 | Bosco |
| 2009/0229941 | A1 | | 9/2009 | Pardee |

OTHER PUBLICATIONS

Written Opinion issued in corresponding international (PCT) application PCT/US2009/062453 (Jul. 7, 2010).

English Language Abstract of JP-4-181034.

International Preliminary Report on Patentability issued in corresponding International (PCT) Patent Application No. PCT/US2009/062453 (May 26, 2011).

* cited by examiner

ROTATIONAL COUPLING DEVICE WITH WEAR COMPENSATION STRUCTURE

This application is a divisional application of, and claims priority to, U.S. patent application Ser. No. 12/268,739 filed Nov. 11, 2008, now U.S. Pat. No. 8,123,012 the entire disclosure of which is incorporated herein by reference.

BACKGROUND OF THE INVENTION

1. Field of the Invention

This invention relates to rotational coupling devices such as brakes and clutches and, in particular, to a rotational coupling device having structure to compensate for wear on the braking surfaces of the device.

2. Discussion of Related Art

Rotational coupling devices such as clutches and brakes are used to control transfer of torque between rotational bodies. One type of conventional device is illustrated in U.S. Pat. Nos. 5,119,918, 5,285,882 and 5,971,121, the entire disclosures of which are incorporated herein by reference. This device includes a rotor that is coupled to an input shaft for rotation with the input shaft about a rotational axis. A field shell is also disposed about the input shaft on one side of the rotor and is fixed against rotation. The field shell defines radially spaced, axially extending inner and outer poles between which an electrical conductor is disposed, facing the rotor. A brake plate is coupled to the field shell and axially spaced from the field shell. The brake plate is disposed on a side of the rotor opposite the conductor. An armature coupled to an output member is disposed on the same side of the rotor as the brake plate and is disposed axially between the rotor and the brake plate. The armature is coupled to an output member by a plurality of leaf springs. Energizing the conductor produces a magnetic circuit in the field shell, rotor and armature that draws the armature into engagement with the rotor and couples the input shaft and output member together for rotation. Upon deenergization of the conductor, the leaf springs draw the armature out of engagement with the rotor and into engagement with the brake plate to brake the armature and output member. Permanent magnets coupled to the brake plate are also used to create another magnetic circuit between the brake plate, the field shell and the armature to assist the leaf springs in braking the armature and output member.

Repeated engagement of the armature with the rotor during clutch engagement and with the brake plate during braking causes wear on the engagement surfaces of the armature, the rotor, and the brake plate. Over time, this wear increases the air gap that exists between the armature and the rotor when the armature is engaged with the brake plate. The increasing air gap requires increased current to draw the armature into engagement with the rotor and engage the clutch. The current demand ultimately exceeds the service constraints of the device thereby reducing the useful life of the device.

The inventor herein has recognized a need for a rotational coupling device that will minimize and/or eliminate one or more of the above-identified deficiencies.

SUMMARY OF THE INVENTION

The present invention provides a rotational coupling device.

A rotational coupling device in accordance with one embodiment of the present invention includes a rotor coupled to an input shaft for rotation therewith. The input shaft is disposed about a rotational axis and the rotor defines a first clutch engagement surface. A field shell is disposed about the input shaft and fixed against rotation. An electrical conductor is disposed within the field shell on a first side of the rotor. A brake plate is spaced axially from and coupled to the field shell. The brake plate defines a first brake engagement surface. An armature is disposed axially between the rotor and the brake plate on a second side of the rotor opposite the conductor. The armature is coupled to an output member and defines a second clutch engagement surface and a second brake engagement surface. A permanent magnet is coupled to one of the brake plate and the armature, the magnet urging the armature into engagement with the brake plate. A removable shim is disposed axially between the brake plate and the field shell and at least a portion of the shim has an axial dimension configured to approximate an anticipated decrease in axial dimension in at least one of the rotor, the armature and the brake plate resulting from wear during engagement of the first and second clutch engagement surfaces and engagement of the first and second brake engagement surfaces.

A rotational coupling device in accordance with another embodiment of the present invention includes a rotor coupled to an input shaft for rotation therewith. The input shaft is disposed about a rotational axis and the rotor defines a first clutch engagement surface. A field shell is disposed about the input shaft and fixed against rotation. An electrical conductor is disposed within the field shell on a first side of the rotor. A brake plate is spaced axially from and coupled to the field shell. The brake plate defines a first brake engagement surface. An armature is disposed axially between the rotor and the brake plate on a second side of the rotor opposite the conductor. The armature is coupled to an output member and defines a second clutch engagement surface and a second brake engagement surface. A permanent magnet is coupled to one of the brake plate and the armature, the magnet urging the armature into engagement with the brake plate. An adjustable spacer is disposed between the brake plate and the field shell. Adjustment of the spacer permits movement of the brake plate towards the field shell to compensate for wear on at least one of the first clutch engagement surface, the second clutch engagement surface, the first brake engagement surface and the second brake engagement surface. The adjustable spacer may comprise, for example, a compressible member, a deformable member or a threaded bushing.

A rotational coupling device in accordance with the present invention represents an improvement over conventional devices. The removable shim or adjustable spacer enables the brake plate to be moved axially relative to the armature to compensate for wear on the engagement surfaces of the rotor, armature, and brake plate. As a result, a relatively consistent air gap and magnetic circuit can be maintained between the armature and the rotor so that the current required to engage the clutch does not increase beyond system constraints and the service life of the device is extended.

These and other advantages of this invention will become apparent to one skilled in the art from the following detailed description and the accompanying drawings illustrating features of this invention by way of example.

DETAILED DESCRIPTION OF EMBODIMENTS OF THE INVENTION

Figure 1:
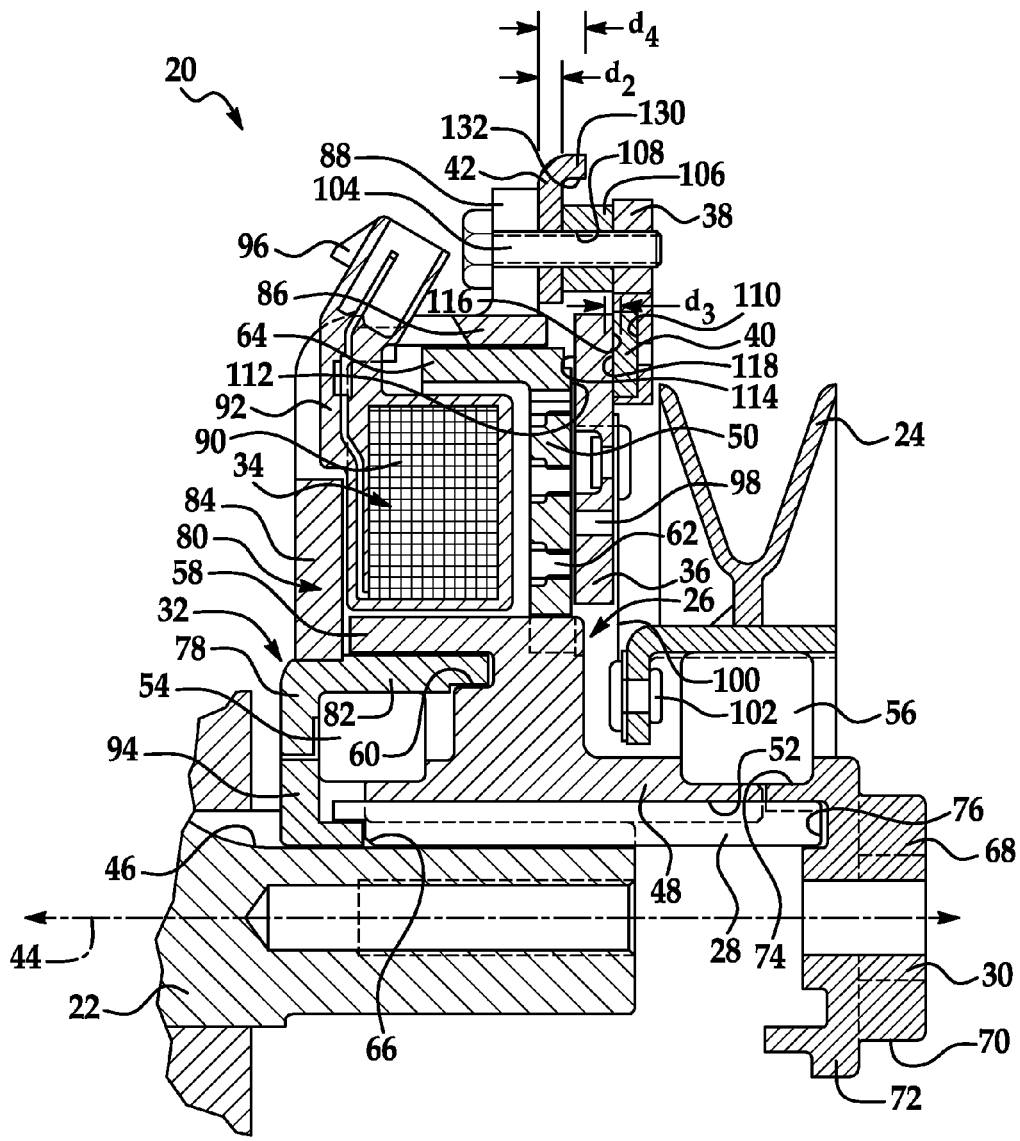
FIG. 1 is a partial cross-sectional view of a rotational coupling device in accordance with one embodiment of the present invention.

Referring now to the drawings wherein like reference numerals are used to identify identical components in the various views, FIG. 1 illustrates a rotational coupling device 20 in accordance with one embodiment of the present invention. Device 20 functions as a clutch to selectively transfer torque from an input shaft 22 to an output member 24. Device 20 also functions as a brake on output member 24 when torque is not being transferred to output member 24. Device 20 may be provided for use in a riding lawnmower or similar device. It will be understood by those of ordinary skill in the art, however, that device 20 may be used in a wide variety of applications requiring a clutch or brake. Device 20 may include a rotor 26, a key 28, a spacer 30, a field shell 32, an electrical conduction assembly 34, an armature 36, a brake plate 38, one or more permanent magnets 40 and a removable shim 42.

Input shaft 22 provides a source of torque for driving output member 24. Shaft 22 may be made from conventional metals and metal alloys and may be solid or tubular. Shaft 22 is centered about a rotational axis 44 and is driven by an engine, electric motor or other conventional power source. In the illustrated embodiment input shaft 22 is inserted into device 20 on a side of device 20 opposite output member 24. It should be understood, however, that the orientation of input shaft 22 and spacer 30 could be reversed such that input shaft 22 is inserted into device 20 on the same side as output member 24. Shaft 22 defines an axially extending keyway 46 configured to receive key 28.

Output member 24 transfers torque to a driven device such as a lawnmower blade. Member 24 may comprise a conventional pulley around which a torque transmitting belt is wound and coupled to the driven device.

Rotor 26 is provided for selective engagement with armature 36 to transmit torque between input shaft 22 and output member 24. Rotor 26 is disposed about axis 44 and is coupled to input shaft 22 for rotation therewith. Rotor 26 may be made from conventional metals and metal alloys and includes a hub 48 and a rotor disc 50.

Hub 48 is tubular and defines a central bore into which input shaft 22 extends. Hub 48 defines an axially extending keyway 52 shaped complementary to, and configured to receive, key 28. Keyway 52 is opposed to keyway 46 of shaft 22 upon assembly of device 20 on shaft 22. At either axial end, hub 48 abuts against and supports bearings 54, 56. At its radially outer diameter, hub 48 defines an axially extending inner rotor pole 58. Hub 48 further defines an axially extending recess 60 radially inwardly of pole 58 for a purpose described hereinbelow.

Disc 50 extends radially outwardly from hub 48. Disc 50 is coupled to hub 48 through, for example, a press-fit relationship including plurality of complementary lugs and notches. As is known in the art, disc 50 may include a plurality of radially spaced rows of angularly spaced, banana shaped slots 62. Upon energization of conduction assembly 34, slots 62 cause magnetic flux to travel back and forth between disc 50 and armature 36 across an air gap enabling a high torque engagement between rotor 26 and armature 36. In the illustrated embodiment, disc 50 includes three rows of slots 62. It should be understood, however, that the number of rows of slots 62 the number of slots 62 in any one row, and the size and shape of slots 62 may vary. At its outer diameter, disc 50 defines an axially extending outer rotor pole 64. Pole 64 is radially aligned with pole 58 and spaced radially outwardly of pole 58.

Key 28 is provided to rotatably couple shaft 22 and rotor 26. Key 28 may be made from conventional metals and metal alloys. Kay 28 is configured to be received within opposed keyways 46, 52 of shaft 22 and rotor hub 48, respectively. Key 28 may be generally square or rectangular in cross-section. Key 28 and keyway 52 may be shaped complementary to one another in such a way that radially inward movement of key 28 relative to rotor 26 after installation of key 28 in keyway 52 is limited. For example, key 28 may assume a substantially keystone shape in radial cross-section and taper moving radially inwardly from its radially outermost edge. Key 28 may also be shaped complementary to spacer 30. Key 28 may have a chamfered or beveled edge 66 at either end to enable easier assembly.

Spacer 30 is provided to support output member 24 in assembled relation with the other components of device 20 and may be made from conventional materials including powdered metals. Spacer 30 is disposed about axis 44 and is generally cylindrical in shape. Spacer 30 is configured to receive a fastener (not shown) that extends through spacer 30 and into input shaft 22. Spacer 30 may define a head 68 at one axial end having a plurality of flats 70 that allow input shaft 22 to be secured while applying torque to the fastener. Spacer 30 may further define a body 72 extending axially from head 68. Body 72 has a generally cylindrical outer surface 74 on which bearing 56 may be supported between opposed shoulders on rotor hub 48 and spacer 30. Spacer 30 may be shaped in a complementary fashion relative to key 28 to limit radial and axial movement of key 28 relative to spacer 30. Spacer 30 may define an axially extending recess 76 closed at one axial end and configured to receive one end of key 28. Upon assembly of device 20, radially inward and outward movement of key 28 is limited relative to spacer 30 and axial movement of key 28 relative to spacer 30 is also limited in one axial direction (to the right in FIG. 1). It should be understood that the key 28 and spacer 30 could be shaped in a number of ways provided that key 28 and spacer 30 are shaped in a complementary fashion to limit radial and/or axial movement of key 28 relative to spacer 30.

Field shell 32 is provided to house conduction assembly 34. Shell 32 also forms part of a magnetic circuit that causes the selective engagement of rotor 26 and armature 36. Field shell 32 may be made from conventional metals and metal alloys, including steel. Shell 32 is cylindrical and is disposed about axis 44 and is supported on an outer race of bearing 54. Shell 32 is fixed against rotation through, for example, a fastener (not shown) extending through a slot (not shown) in shell 32. Shell 32 is generally U-shaped in cross-section and includes radially inner and radially outer annular members 78, 80.

Inner member 78 is supported on an outer race of bearing 54. Member 78 is generally L-shaped in cross-section and defines an axially extending inner pole 82. Pole 82 extends into recess 60 of hub 48 of rotor 26 and is therefore disposed radially inwardly of inner rotor pole 58. As described more fully in commonly assigned and copending U.S. patent application Ser. No. 11/150,671, the entire disclosure of which is incorporated herein by reference, the relative location of poles 58, 82 is advantageous for several reasons. First, the magnetic efficiency of the magnetic circuit involving rotor 26, field shell 32 and armature 36 is improved by reducing the number of air gaps for at least some of the magnetic flux in the circuit. Second, the annular gap in which conduction assembly 34 is disposed is enlarged enabling easier insertion and fastening of assembly 34 within field shell 32.

Outer member 80 is coupled to and supported on inner member 78. Outer member 80 defines an end wall 84, an axially extending outer pole 86, and a flange 88. End wall 84 extends radially outwardly from member 78. Pole 86 is integral with, and extends axially from, end wall 84. Pole 86 is disposed radially outwardly of pole 64 of rotor 26. Flange 88 is integral with, and extends radially outwardly from, pole 86 at an end of pole 86 opposite end wall 84. Flange 88 extends along at least a portion of the circumference of pole 86.

Conduction assembly 34 is provided to create a magnetic circuit among rotor 26, field shell 32, and armature 36 to cause movement of armature 36 into engagement with rotor 26 and transmission of torque from input shaft 22 to output member 24. Conduction assembly 34 is generally annular and is disposed about axis 44 within field shell 32. In particular, assembly 34 is disposed between the inner and outer poles 82, 86 of shell 32. Assembly 34 includes a conductor 90 and a shell 92.

Conductor 90 may comprise a conventional copper coil although other known conductors may alternatively be used. Conductor 90 may be connected electrically to a power supply (not shown) such as a battery. Upon energization of conductor 90, a magnetic circuit is formed between rotor 26, field shell 32, and armature 36. Magnetic flux flows from outer pole 86 of shell 32 across an air gap to outer pole 64 of rotor 26. Flux then travels back and forth between disc 50 and armature 36 across the air gap between them. Flux then flows from disc 50 of rotor 26 to hub 48 of rotor 26. Finally, flux flows from hub 48 back to members 78, 80 of field shell 32 along several paths. In particular, a portion of the flux flows directly from inner rotor pole 58 to member 80. Another portion of the flux flows from hub 48 through inner pole 82 of member 78 before flowing to member 80. Still another portion of the flux may flow from hub 48 to a support hub 94 radially inwardly of bearing 54 and then to member 78 and member 80 allowing a portion of the flux to avoid the high density area of inner rotor pole 58 and inner field shell pole 82 and further improving the magnetic efficiency of the circuit.

Shell 92 is provided to house conductor 90 and is also used to mount conductor 90 within field shell 32. Shell 92 may be molded from conventional plastics. Shell 92 may include an integral terminal connector 96 through which conductor 90 may be electrically connected to a power source. Shell 92 may also define one or more lugs (not shown) sized to be received within recesses in end wall 84 of field shell 32 to prevent rotation of conduction assembly 34. Shell 92 may include a radially outwardly extending flange (not shown) disposed proximate outer pole 86 of field shell 32 and affixed to shell 32 at a plurality of points as described in commonly assigned pending U.S. patent application Ser. No. 11/150,670, the entire disclosure of which is incorporated herein by reference.

Armature 36 is provided to transmit a braking torque to output member 24 and to selectively transmit a drive torque from rotor 26 to output member 24. Armature 36 may be made form a variety of conventional metals and metal alloys including steel. Armature 36 is annular in construction and disposed about axis 44. Armature 36 is axially spaced from rotor 26 by an air gap. Like rotor disc 50, armature 36 includes a plurality of radially spaced rows of angularly spaced slots 98 that facilitate travel of magnetic flux back and forth between rotor 26 and armature 36 upon energization of conduction assembly 34. In the illustrated embodiment, armature 36 includes two rows of slots 98. It should be understood that the number of rows of slots 98 on armature 36, the number of slots 98 in any one row, and the size and shape of slots 98 may vary. Armature 36 is coupled to output member 24. In particular, armature 36 may be coupled to output member 24 by a plurality of leaf springs 100. Springs 100 transmit drive and braking torque from armature 36 to output member 24 and allow for axial movement of armature 36 relative to member 24 and towards and away from rotor disc 50. Springs 100 may be made from stainless steel and are connected at one end to armature 36 and at an opposite end to output member 24 using conventional fasteners 102 such as rivets, screws, bolts, or pins.

Brake plate 38 provides a braking surface for engagement by armature 36 to brake output member 24. Plate 38 further forms part of a magnetic circuit with armature 36 and magnets 40 and may provide a means for housing magnet 40. Brake plate 38 may be made from conventional materials having a relatively low magnetic reluctance including conventional metals and metal alloys such as steel. Brake plate 38 extends about at least a portion of the circumference of device 20, and preferably only a portion of the circumference of device 20, and is coupled to field shell 32. In particular, brake plate 38 is coupled to flange 88 of field shell 32 and suspended therefrom using one or more fasteners 104. Fasteners 104 may be made from a material or materials having a relatively high magnetic reluctance (including non-magnetic materials) to reduce or eliminate flux transfer between brake plate 38 and field shell 32 and thereby facilitate clutch engagement when conduction assembly 34 is energized. Throughout this application, the term "relatively high magnetic reluctance" shall mean a magnetic reluctance that is greater than the magnetic reluctance of armature 36 such that flux transfer is more likely to occur between brake plate 38 and armature 36 than between brake plate 38 and fastener 104. Brake plate 38 may be axially spaced from flange 88 of field shell 32 using one or more spacers 106. Spacers 106 may include bores 108 through which fasteners 104 extend. Spacers 106 may likewise be made from a material or materials having a relatively high magnetic reluctance (including non-magnetic materials) to reduce or eliminate flux transfer between brake plate 38 and field shell 32.

Magnets 40 are provided to create a magnetic circuit between brake plate 38 and armature 36 to draw armature 36 into engagement with brake plate 38 and provide a braking torque to output member 24. Magnets 40 may comprise neodymium iron boron (Nd—Fe—B) magnets or other known permanent magnets. Magnets 40 preferably are disposed about only a portion of the circumference of device 20. Magnets 40 are axially aligned with a portion of armature 36 thereby reducing the number of air gaps in the magnetic circuit relative to conventional coupling devices and improving magnetic efficiency, as described in greater detail in commonly assigned, copending U.S. patent application Ser. No.

11/150,027, the entire disclosure of which is incorporated herein by reference. Magnets 40 may be oriented such that magnetic flux travels throughout magnets 40 in an axial, radial, or arcuate (circumferential) direction. Magnets 40 may be received within pockets 110 formed in brake plate 38. Alternatively, magnets 40 may instead be received within a pocket formed in armature 36 and axially aligned with brake plate 38. Magnets 40 may be arranged such that one face of each magnet 40 is flush with one side (and the braking surface) of brake plate 38 (or armature 36). By placing magnets 40 such that one face is flush with the braking surface of brake plate 38 (or armature 36), magnets 40 add to the wear surface of brake plate 38 (or armature 36) increasing its wear resistance and the braking surface.

Shim 42 is provided to allow for adjustment of the position of brake plate 38 to compensate for wear on the clutch engagement surfaces 112, 114 of rotor 26 and armature 36, respectively and on the brake engagement surfaces 116, 118 of armature 36 and brake 38, respectively. Shim 42 may be made from a variety of materials including conventional metals and metal alloys. Shim 42 is disposed axially between field shell 32 and brake plate 38 with spacer 106. In the illustrated embodiment, shim 42 is disposed axially between field shell 32 and spacer 106 and is nearer to field shell 32 than brake plate 38, but it should be understood that the positions of shim 42 and spacer 106 could be reversed. Shim 42 may be in contact with brake plate 38.

Figure 2:
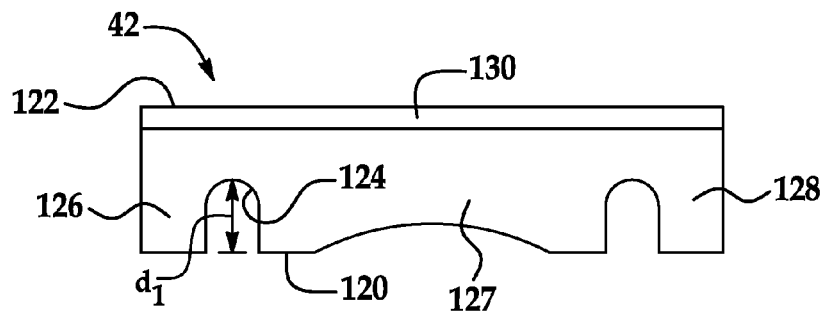
FIG. 2 is a plan view of a removable shim used in the rotational coupling device of FIG. 1.

Referring to FIG. 2, shim 42 has radially inner and outer edges 120, 122. Shim 42 defines a pair of slots 124 formed in inner edge 120 that is configured to receive fasteners 104. Slots 124 have a shape that is complementary to the shape of fasteners 104. In the illustrated embodiment, each slot 124 is substantially U-shaped and configured to receive a circular fastener. The depth $d_1$ of each slot 124 may be greater than the diameter of a corresponding fastener 104 such that a portion of shim 42 (such as any of legs 126, 127, 128) is disposed further radially inward than fastener 104 (best shown in FIG. 1).

Referring again to FIG. 1, at least a portion of shim 42 (i.e., the portion between field shell 32 and spacer 106) has an axial dimension $d_2$ that is configured to approximate an anticipated decrease in axial dimension of one or more of rotor 26, armature 36 and brake plate 38 resulting from wear during engagement of clutch engagement surfaces 112, 114 and brake engagement surfaces 116, 118. For example, dimension $d_2$ may be chosen to approximate a decrease in axial dimension $d_3$ in armature 36 and brake plate 38 resulting from wear during engagement of armature 36 and brake plate 38. During operation of device 20, the clutch engagement surfaces 112, 114 and brake engagement surfaces 116, 118 begin to wear. As a result, the air gap that exists between rotor 26 and armature 36 when armature 36 is engaged with brake plate 38 increases. The increased air gap requires an increase in current in conduction assembly 34 to strengthen the magnetic circuit between rotor 26 and armature 36 and continue to draw armature 36 into engagement with rotor 26. Eventually, the increasing current demand would exceed service limitations on device 20, thereby limiting the useful life of device 20. Because shim 42 has an axial dimension $d_2$ chosen to approximate a decrease in axial dimension in one or more of rotor 26, armature 36 and brake plate 38 (e.g., a decrease $d_3$ in the axial dimensions (or brake engagement surfaces 116, 118) of armature 36 and brake plate 38), shim 42 can be removed at a predetermined time in the service life of device 20 and/or when inspection of device 20 reveals that wear on rotor 26, armature 36 and/or brake plate 38 has made removal appropriate. Upon removal of shim 42, brake plate 38 may be moved towards flange 88 of field shell 32. This action will substantially restore the original air gap between rotor 26 and armature 36 by compensating for wear on braking surfaces 116, 118 of armature 36 and brake plate 38 and on clutch engagement surfaces 112, 114 of rotor 26 and armature 36 that would otherwise cause armature 36 to be located further from rotor 26 when engaged with brake plate 38. By maintaining the air gap, increased current demands during clutch engagement can be minimized and the service life of device 10 extended.

The radially outer portion of shim 42 may define an axially ending lip 130. As shown in FIG. 1, lip 130 has an axial dimension $d_4$ that is greater than dimension $d_2$. Lip 130 facilitates removal of shim 42 by hand or tool by providing a surface 132 against which a force can be applied to move shim 42 radially outwardly away from device 20.

Figure 3:
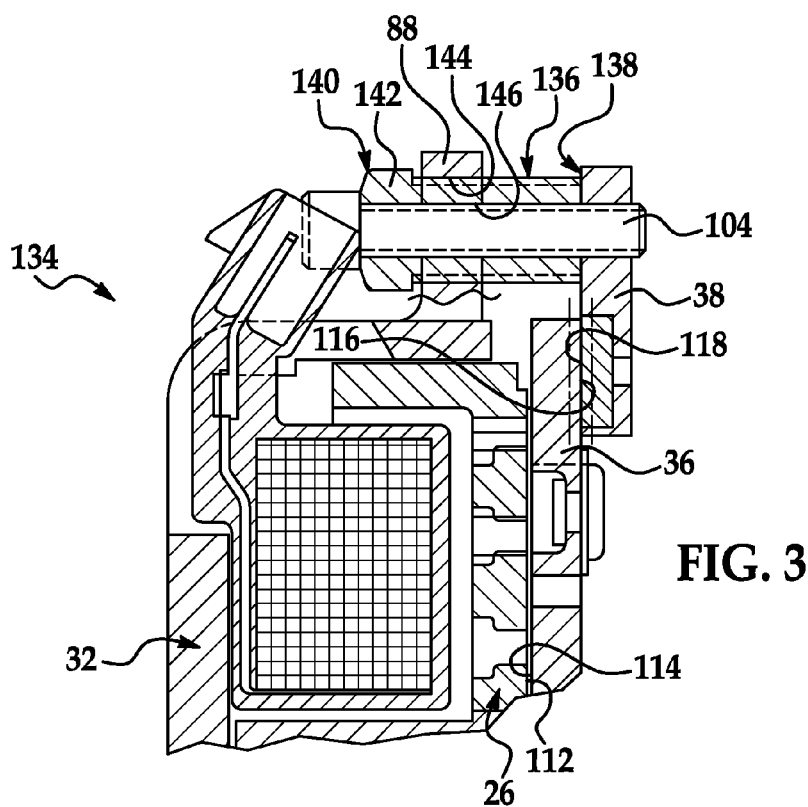
FIG. 3 is a partial cross-sectional view of a rotational coupling device in accordance with another embodiment of the present invention.

Referring now to FIG. 3, a rotational coupling device 134 in accordance with another embodiment of the present invention is illustrated. Device 134 is similar to device 20. Therefore, like structures are identified with the same reference numbers and a description of like structures may be found hereinabove. Device 134 differs from device 20 in that device 134 includes a adjustable spacer 136. As used herein, "adjustable" refers to adjustment of the position or form of the spacer within the rotational coupling device and excludes simply removing the spacer (or a part of the spacer) from the device.

Spacer 136 is provided to allow brake plate 38 to be moved axially towards armature 36 to compensate for wear on one or more of clutch engagement surfaces 112, 114 and brake engagement surfaces 116, 118. Spacer 136 may comprise a bushing that is disposed between flange 88 of field shell 32 and brake plate 38 and extends through flange 88. One axial end 138 of spacer 136 abuts brake plate 38. The opposite axial end 140 of spacer 136 may define a head 142. The radially outer surface of spacer 136 defines a plurality of threads configured to engage corresponding threads in an aperture 144 in flange 88. Rotation of spacer 136 causes movement of spacer 136 parallel to axis 44 and allows corresponding movement of brake plate 38 thereby permitting infinite adjustment of the axial position of brake plate 38. Spacer 136 defines a bore 146 configured to receive fastener 104. Fastener 104 extends through aligned bores in flange 88, spacer 136 and brake plate 38 to secure the position of brake plate 38 against end 138 of spacer 136. Spacer 136 may be made from a material or materials having a relatively high magnetic reluctance (including non-magnetic materials) to reduce or eliminate flux transfer between brake plate 38 and field shell 32.

Figure 4:
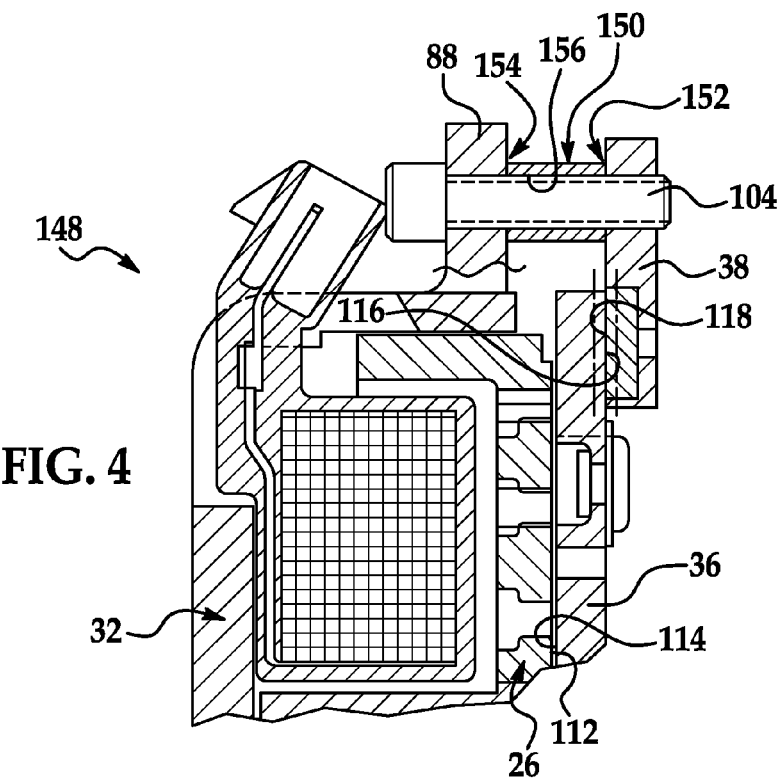
FIG. 4 is a partial cross-sectional view of a rotational coupling device in accordance with another embodiment of the present invention.

Referring now to FIG. 4, a rotational coupling device 148 in accordance with another embodiment of the present invention is illustrated. Device 148 is again similar to device 20. Therefore, like structures are identified with the same reference numbers and a description of like structures may be found hereinabove. Device 148 differs from device 20 in that device 148 includes a adjustable spacer 150.

Spacer 150 is again provided to allow brake plate 38 to be moved axially towards armature 36 to compensate for wear on one or more of clutch engagement surfaces 112, 114 and brake engagement surfaces 116, 118. Spacer 150 may comprise a compressible or crushable body that is disposed between flange 88 of field shell 32 and brake plate 38. One axial end 152 of spacer 150 abuts brake plate 38 while the opposite axial end 154 of spacer 150 abuts flange 88 of field shell 32. Spacer 150 defines a bore 156 configured to receive fastener 104. Fastener 104 extends through aligned bores in flange 88, spacer 150 and brake plate 38. Rotation of fastener 104 draws brake plate 38 towards flange 88 and compresses spacer 150 thereby permitting infinite adjustment of the axial position of brake plate 38. Spacer 150 may again be made from a material or materials having a relatively high magnetic reluctance (including non-magnetic materials) to reduce or eliminate flux transfer between brake plate 38 and field shell 32.

Figure 5:
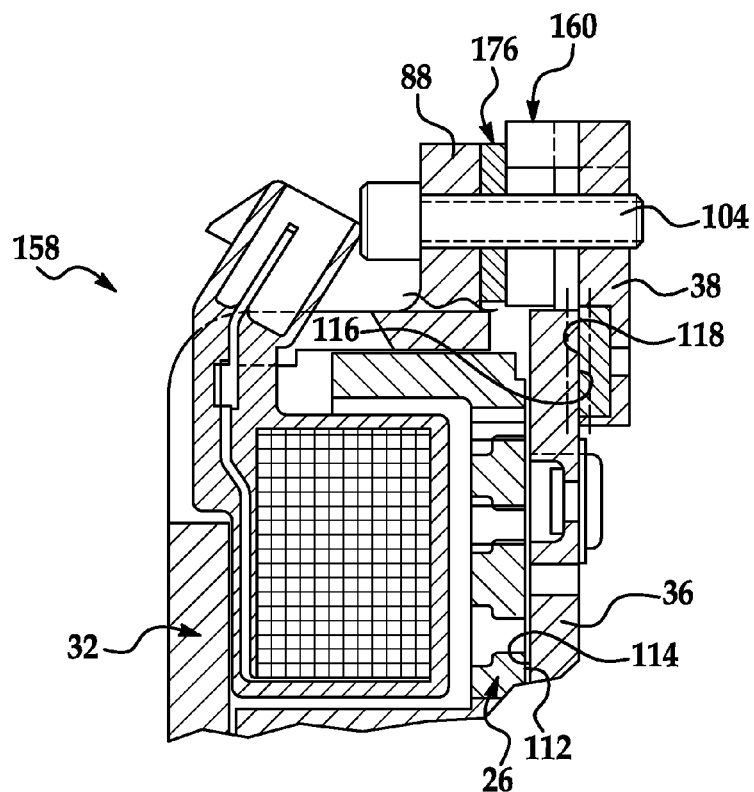
FIG. 5 is a partial cross-sectional view of a rotational coupling device in accordance with another embodiment of the present invention.
Figure 6:
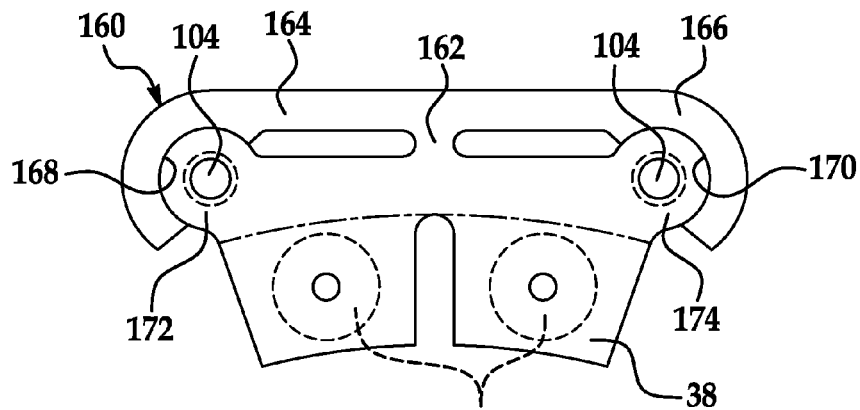
FIGS. 6-7 are plan views of a portion of the coupling device shown in FIG. 5.
Figure 7:
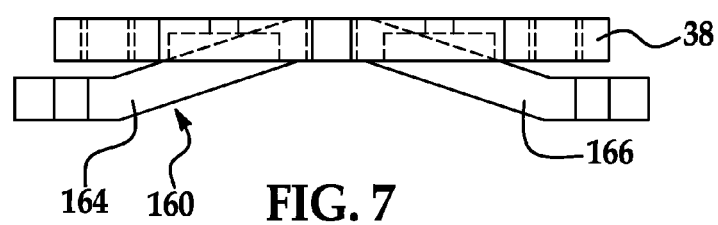

Referring now to FIGS. 5-7, a rotational coupling device 158 in accordance with another embodiment of the present invention is illustrated. Device 158 is again similar to device 20. Therefore, like structures are identified with the same reference numbers and a description of like structures may be found hereinabove. Device 158 differs from device 20 in that device 158 includes a adjustable spacer 160.

Spacer 160 is again provided to allow brake plate 38 to be moved axially towards armature 36 to compensate for wear on one or more of clutch engagement surfaces 112, 114 and brake engagement surfaces 116, 118. Spacer 160 may comprise a deformable body that is disposed between flange 88 of field shell 32 and brake plate 38. In particular, spacer 160 may comprise an elastically deformable body. As shown in the illustrated embodiment, spacer 160 may form a unitary structure with brake plate 38. It should be understood, however, that spacer 160 may form a separate component. Spacer 160 extends axially relative to brake plate 38 such that spacer 160 is disposed nearer to flange 88 than engagement surface 118 of brake plate 38. Referring to FIG. 6, in the illustrated embodiment, spacer 160 is connected to brake plate 38 at a neck 162. Arms 164, 166 extend axially and circumferentially from either side of neck 162. Arms 164, 166 include semicircular ends defining recesses 168, 170, respectively, having an inner diameter about equal in size to an outer diameter of corresponding bosses 172, 174 formed in brake plate 38 through which fasteners 104 extend. Rotation of fasteners 104 draws brake plate 38 towards flange 88 and deforms arms 164, 166 urging them towards brake plate 38 thereby permitting infinite adjustment of the axial position of brake plate 38. Device 158 may further include washers 176 disposed about fasteners 104 between arms 164, 166 of spacer 160 and flange 88. Washers 176 may be made from a material or materials having a relatively high magnetic reluctance (including non-magnetic materials) to reduce or eliminate flux transfer between brake plate 38 and field shell 32.

Figure 8:
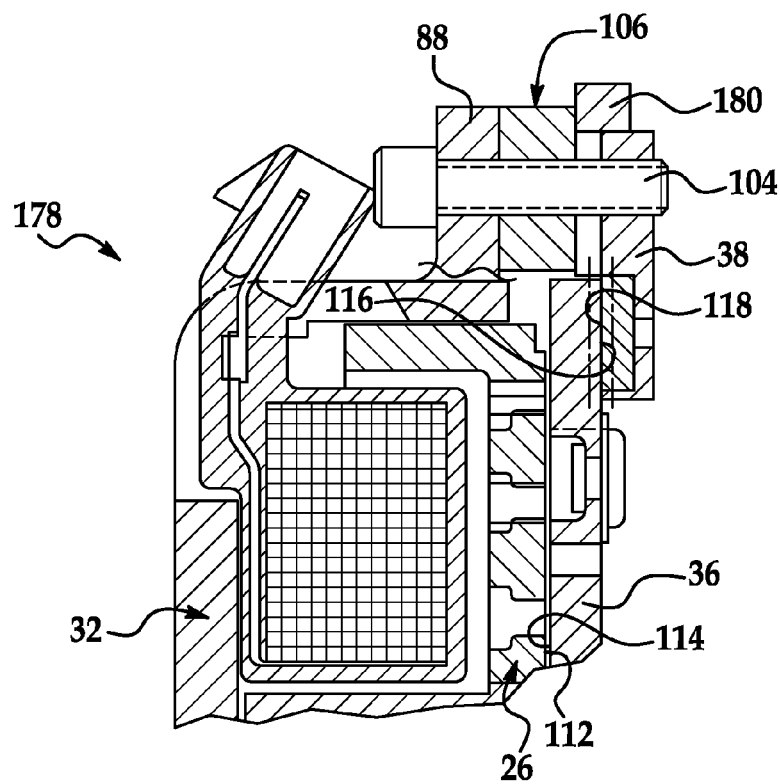
FIG. 8 is a partial cross-sectional view of a rotational coupling device in accordance with another embodiment of the present invention.
Figure 9:
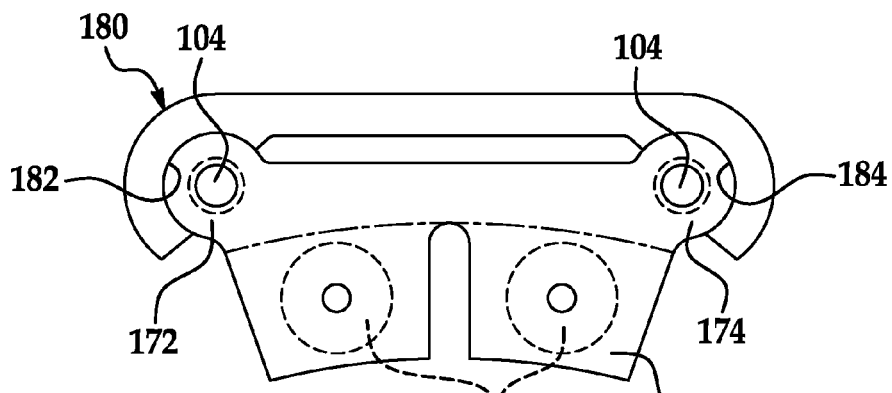
FIGS. 9-10 are plan views of a portion of the coupling device shown in FIG. 8.
Figure 10:
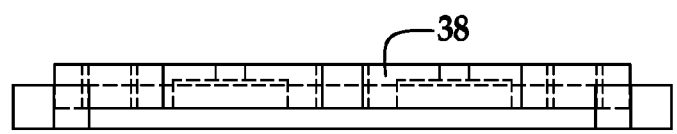

Referring now to FIGS. 8-10, a rotational coupling device 178 in accordance with another embodiment of the present invention is illustrated. Device 178 is again similar to device 20. Therefore, like structures are identified with the same reference numbers and a description of like structures may be found hereinabove. Device 178 differs from device 20 in that device 178 includes a adjustable spacer 180.

Spacer 180 is again provided to allow brake plate 38 to be moved axially towards armature 36 to compensate for wear on one or more of clutch engagement surfaces 112, 114 and brake engagement surfaces 116, 118. Spacer 180 comprises a body that is in frictional engagement with brake plate 38. Spacer 180 may be formed from the same stamping as brake plate 38 through a semi-pierce operation. Spacer 180 is formed in such a way that spacer 180 can be placed in a tight frictional engagement with brake plate 38. In the illustrated embodiment, spacer 180 defines semicircular ends defining recesses 182, 184, respectively, having an inner diameter about equal in size to an outer diameter of corresponding bosses 172, 174 formed in brake plate 38 through which fasteners 104 extend. As compared to the spacer 160 shown in FIGS. 5-7, however, spacer 180 always radially overlaps at least a portion of brake plate 38 as shown in FIG. 8. Rotation of fasteners 104 draws brake plate 38 towards flange 88 against the frictional forces between spacer 180 and brake plate 138 creating additional radial overlap between spacer 180 and brake plate 38 and thereby permitting infinite adjustment of the axial position of brake plate 38. This arrangement results in an increasing radial (and ultimately frictional) force as rotation of fastener 104 draws brake plate 38 towards flange 88 of field shell 32.

While the invention has been shown and described with reference to one or more particular embodiments thereof, it will be understood by those of skill in the art that various changes and modifications can be made without departing from the spirit and scope of the invention. For example, it should be understood that although only one shim is shown in the illustrated embodiment, a plurality of shims could be used to facilitate finer compensation adjustments. It should also be understood that the shape of shim 42 could vary from the illustrated embodiment without departing from the spirit of the present invention.

We claim:

1. A rotational coupling device, comprising:
   a rotor coupled to an input shaft for rotation therewith, said input shaft disposed about a rotational axis and said rotor defining a first clutch engagement surface;
   a field shell disposed about said input shaft and fixed against rotation;
   an electrical conductor disposed within said field shell on a first side of said rotor;
   a brake plate spaced axially from and coupled to said field shell, said brake plate defining a first brake engagement surface;
   an armature disposed axially between said rotor and said brake plate on a second side of said rotor opposite said conductor, said armature coupled to an output member and defining a second clutch engagement surface facing and a second brake engagement surface;
   a permanent magnet coupled to one of said brake plate and said armature, said magnet urging said armature into engagement with said brake plate; and,
   an adjustable spacer disposed between said brake plate and said field shell, adjustment of said spacer permitting movement of said brake plate towards said field shell to compensate for wear on at least one of said first clutch engagement surface, said second clutch engagement surface, said first brake engagement surface and said second brake engagement surface
   wherein said adjustable spacer comprises a compressible body.

2. The rotational coupling device of claim 1 wherein said compressible body is made from a material having a higher magnetic reluctance than said field shell and said brake plate.

3. The rotational coupling device of claim 1, further comprising a fastener extending through aligned bores in said field shell, said compressible body and said brake plate.

4. A rotational coupling device, comprising:
   a rotor coupled to an input shaft for rotation therewith, said input shaft disposed about a rotational axis and said rotor defining a first clutch engagement surface;
   a field shell disposed about said input shaft and fixed against rotation;
   an electrical conductor disposed within said field shell on a first side of said rotor;
   a brake plate spaced axially from and coupled to said field shell, said brake plate defining a first brake engagement surface;
   an armature disposed axially between said rotor and said brake plate on a second side of said rotor opposite said conductor, said armature coupled to an output member and defining a second clutch engagement surface facing and a second brake engagement surface;

a permanent magnet coupled to one of said brake plate and said armature, said magnet urging said armature into engagement with said brake plate; and, an adjustable spacer disposed between said brake plate and said field shell, adjustment of said spacer permitting movement of said brake plate towards said field shell to compensate for wear on at least one of said first clutch engagement surface, said second clutch engagement surface, said first brake engagement surface and said second brake engagement surface wherein said adjustable spacer comprises a deformable body.

5. The rotational coupling device of claim 4 wherein said brake plate and said deformable body form a unitary structure.

6. The rotational coupling device of claim 4 wherein said deformable body is elastically deformable.

* * * * *